No. 884,307. PATENTED APR. 7, 1908.
G. WINEMILLER & G. GENTSLINGER.
CORN SHOCK LOADER.
APPLICATION FILED NOV. 18, 1907.
2 SHEETS—SHEET 1.
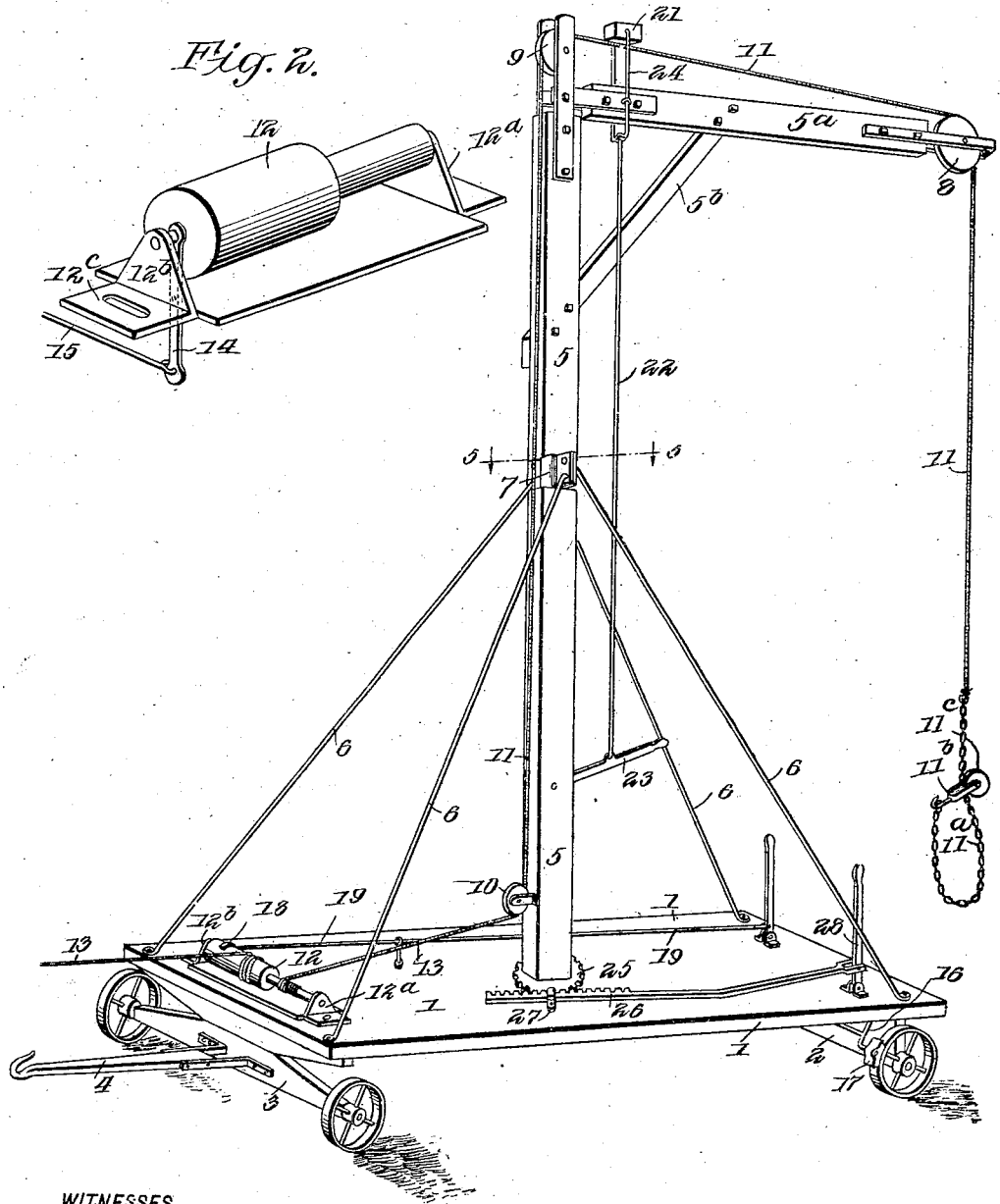
WITNESSES
INVENTORS
GEORGE WINEMILLER
GEORGE GENTSLINGER
BY
ATTORNEYS No. 884,307. PATENTED APR. 7, 1908.
G. WINEMILLER & G. GENTSLINGER.
CORN SHOCK LOADER.
APPLICATION FILED NOV. 18, 1907.
2 SHEETS—SHEET 2.
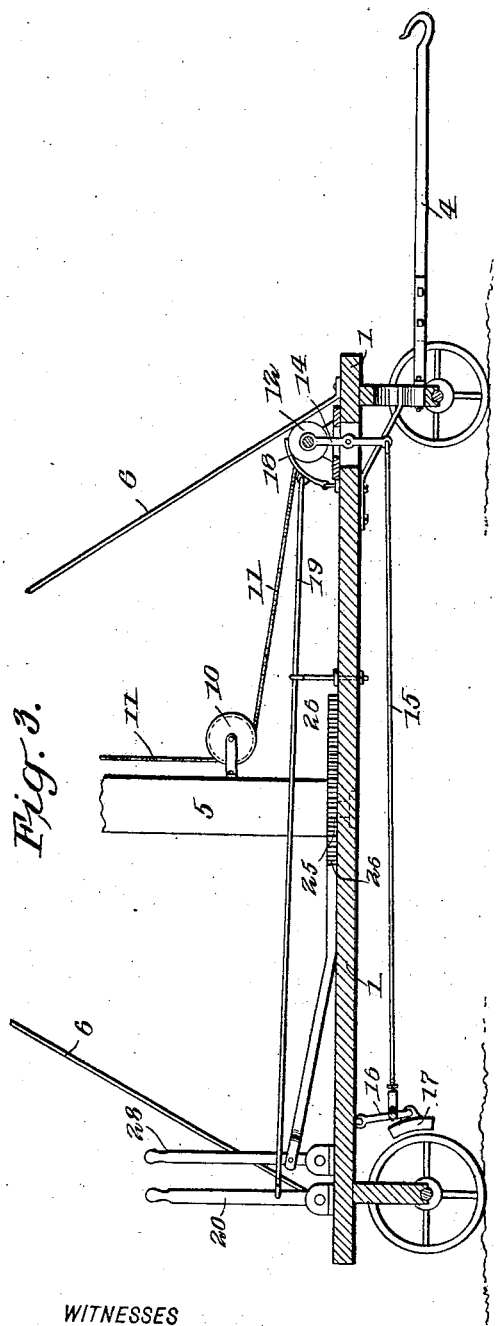
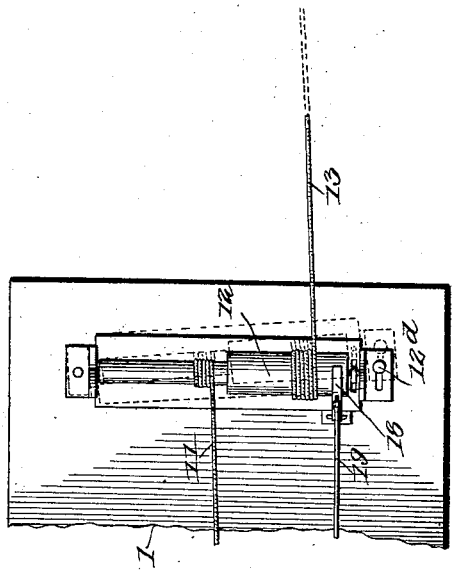
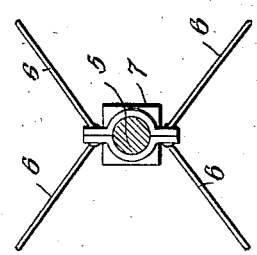
WITNESSES
INVENTORS
GEORGE WINEMILLER
GEORGE GENTSLINGER
BY
ATTORNEYS

UNITED STATES PATENT OFFICE.

GEORGE WINEMILLER AND GEORGE GENTSLINGER, OF WAPAKONETA, OHIO.

CORN-SHOCK LOADER.

No. 884,307.  Specification of Letters Patent.  Patented April 7, 1908.

Application filed November 18, 1907. Serial No. 402,769.

*To all whom it may concern:*

Be it known that we, GEORGE WINEMILLER and GEORGE GENTSLINGER, citizens of the United States, and residents of Wapakoneta, in the county of Auglaize and State of Ohio, have invented an Improvement in Corn-Shock Loaders, of which the following is a specification.

Our invention is an improvement in that class of portable apparatus for use in the field for loading corn-shocks upon a wagon. The distinguishing feature of the inventions of this class is a post supported vertically upon a truck, or wheeled platform, and provided with mechanism for hoisting the corn shocks.

Our invention is embodied in the construction, arrangement and combination of parts hereinafter specified and illustrated in the accompanying drawings, in which Figure 1 is a perspective view of our complete invention. Fig. 2 is a perspective view of a differential windlass and the bracket lever-attachment forming a part of the invention. Fig. 3 is a longitudinal section of the lower portion of the apparatus. Fig. 4 is a plan view of the differential windlass and the platform to which it is attached. Fig. 5 is a transverse section on the line 5—5 of Fig. 1.

In Fig. 1 the numeral 1 indicates a horizontal platform mounted upon a fixed rear axle 2 and a pivoted front axle 3, both axles being provided with small wheels. The front axle 3 is also provided with a short pole or tongue 4 to which a horse, or other draft animal may be attached for hauling the loader. A post or standard 5 is pivoted in the center of the platform 1 and supported by guys 6 that extend from the corners of the platform to a collar 7, which, as shown in Figs. 1 and 5, is secured to a reduced cylindrical portion of the post. A horizontal arm $5^a$ is secured to the upper portion of the post 5 and supported by bars $5^b$. A pulley 8 is journaled in a suitable support at the outer end of the arm $5^a$, and another, 9, is similarly journaled in supports at the head of the post, while a third pulley 10 is attached to the base of the post. A hoisting-rope 11 runs on these three pulleys and is attached to the reduced portion of a differential windlass 12, which is journaled at the forward end of the platform 1. A draft-rope or chain 13 is applied to the larger portion of the windlass and adapted to be extended forward for attachment of a draft animal. The two ropes 11 and 13 are wound in opposite directions on the windlass so that if the draft animal attached to rope 13 travels outward from the platform, the hoisting-rope 11 will be taken up, and thus a corn-shock attached to its free end will be hoisted. The free end is preferably formed of a chain $11^a$ and passes through a slot in the shank of a hook $11^b$ which is provided with a pulley $11^c$. The hook is adapted to engage the free end of the chain $11^a$, and when the latter is passed around a shank, and tension is applied, the pulley travels on the chain until the shock is tightly compressed and then hoisted.

It is obviously necessary that the platform or truck shall be held stationary while the shock is being hoisted, otherwise the draft on the rope 13 will haul the truck along too far. We have, therefore, provided an automatic brake which is applied as soon as the draft-rope is under considerable tension. One end of the differential windlass 12 is journaled in a fixed bracket $12^a$ and the other in a movable bracket $12^b$. The latter is right-angular in form and provided with a slot $12^c$ which receives a bolt $12^d$ that enters the platform 1. In normal position the windlass 12 is indicated by full lines Fig. 4; but when sufficient draft is applied to the rope 13, it hauls the large end of the windlass 12 forward to the position shown by dotted lines, and this movement applies a brake to the wheels of the platform, as will be understood by reference to Fig. 3, where a lever 14 is shown projecting up through the platform and pivoted thereto and also to the shaft of the windlass. A rod 15 connects the lower end of said lever with another lever 16 that is pivoted under the platform 1 adjacent to the rear wheels and on which brake-shoes 17 are hung, one of which is shown. It will be understood that the forward movement of the windlass tilts the lever 14, so that through the push-rod 15, the brakes are applied to the rear wheels. Another brake, operated by hand, is provided on the platform, the same consisting, as shown in Figs. 1 and 3, of a curved friction plate 18 pivoted to the platform and adapted to bear on the windlass, and a push-rod 19 which connects said plate with the hand lever 20 pivoted at the rear end of the platform. By pushing on the lever 20 the brake may be applied with greater or less force. This brake is often useful when it is desired to lock or hold the windlass stationary, without reference to tension on the draft-rope 13.

When a corn-shock has been hoisted, and it is desired to release tension on the draft-rope 13, it is requisite that the hoisting-rope 11 shall be held or clamped in some manner. We employ for this purpose a form of brake composed of a block 21, see Fig. 1, a rod 22, and the lever 23, the latter being pivoted to the lower portion of the post 5 and the rod connecting it with a stirrup 24. The stirrup extends on opposite sides of the horizontal arm $5^a$ and supports the block 21 so that when the lever 23 is depressed the block is brought down on the rope 11 so as to clamp it on the arm $5^a$ and prevent its sliding or moving on the pulleys.

For the purpose of rotating the post 5, a toothed or spur gear 25 is attached to its lower end and the rack-bar 26 works in engagement with it, the same being held in due position by a keeper 27. The rack-bar may be operated by a lever 28. It is obvious that by pushing or pulling on said lever, the post will be rotated correspondingly in one direction or the other.

In practical use of our invention, the truck or platform, with attached apparatus, is drawn between the shock to be loaded and the wagon on which it is to be placed; then, the post being rotated so as to bring the pulley 8 over the shock, the chain loop $11^a$ is applied thereto, and, the draft animal attached to the draft-rope 13, being driven forward, the shock is hoisted to due height and then the post is rotated to swing the arm over the wagon, whereupon the draft animal is stopped and the windlass braked by the hand mechanism, or the block 21 is pressed down upon the rope 11, so that the shock will descend upon the wagon without undue rapidity.

What we claim is:

1. The combination, with a wheeled platform and post supported thereon and provided with a lateral arm and pulleys suitably arranged, of a windlass journaled on the front of the platform and adapted to swing laterally at one end, a draft-rope applied to the swinging end of the windlass, and a hoisting-rope applied to the other end of the windlass and running on the aforesaid pulleys, and brake mechanism operatively connected with the swinging end of the windlass whereby it is automatically applied in the hoisting operation, substantially as described.

2. The combination, with a wheeled platform and a post pivoted thereon and provided with a lateral arm, pulleys journaled on the post and arm as described, a hoisting-rope running on said pulleys, a differential windlass journaled on the platform, one end thereof being movable laterally, a hoisting rope running on the said pulleys and attached to the smaller end of the windlass, a draft-rope wound in the opposite direction on the larger portion of the windlass, a lever pivoted to the platform in vertical position and one end connected with the shiftable end of the windlass, a swinging brake-shoe arranged under the platform contiguous to a rear wheel, and a rod operatively connecting such brake-shoe with the aforesaid lever, as shown and described.

3. The combination, with a platform, a vertical post supported thereon and provided with a lateral arm, pulleys journaled on the post and arm, a hoisting-rope running on said pulleys, a brake block arranged above the hoisting-rope for clamping it upon the post arm, a lever pivoted to the post, and a rod connecting it with the brake block, as shown and described.

GEORGE WINEMILLER.
GEORGE GENTSLINGER.

Witnesses:
GEO. HOOPINGARNER,
JOHN HIMMER.